United States Patent
Krayer et al.

(10) Patent No.: US 12,037,433 B2
(45) Date of Patent: Jul. 16, 2024

(54) (CO)POLYMERS OF HYDROPHOBIC MONOMERS AND METHODS OF MAKING AND USE THEREOF

(71) Applicant: BASF SE, Ludwigshafen am Rhein (DE)

(72) Inventors: Michael Krayer, Charlotte, NC (US); Kostas S. Avramidis, Charlotte, NC (US)

(73) Assignee: BASF SE, Ludwigshafen am Rhein (DE)

( * ) Notice: Subject to any disclaimer, the term of this patent is extended or adjusted under 35 U.S.C. 154(b) by 925 days.

(21) Appl. No.: 16/970,392

(22) PCT Filed: Feb. 14, 2019

(86) PCT No.: PCT/US2019/017953
§ 371 (c)(1),
(2) Date: Aug. 17, 2020

(87) PCT Pub. No.: WO2019/161020
PCT Pub. Date: Aug. 22, 2019

(65) Prior Publication Data
US 2021/0108017 A1     Apr. 15, 2021

Related U.S. Application Data (60) Provisional application No. 62/631,554, filed on Feb. 16, 2018.

(51) Int. Cl.
| | | |
|---|---|---|
| C08F 257/02 | (2006.01) | |
| C08F 2/20 | (2006.01) | |
| C08F 220/14 | (2006.01) | |
| C08F 220/18 | (2006.01) | |
| B82Y 30/00 | (2011.01) | |
| B82Y 40/00 | (2011.01) | |

(52) U.S. Cl.
CPC ............ *C08F 257/02* (2013.01); *C08F 2/20* (2013.01); *C08F 220/14* (2013.01); *C08F 220/1804* (2020.02); *C08F 220/1818* (2020.02); *B82Y 30/00* (2013.01); *B82Y 40/00* (2013.01)

(58) Field of Classification Search
CPC ...... C08F 257/02; C08F 220/14; C08F 22/18; C08F 2/20
USPC ....................................................... 523/201
See application file for complete search history.

(56) References Cited

U.S. PATENT DOCUMENTS

| | | |
|---|---|---|
| 4,414,370 A | 11/1983 | Hamielec et al. |
| 4,529,787 A | 7/1985 | Schmidt et al. |
| 4,546,160 A | 10/1985 | Brand et al. |
| 6,841,655 B1 | 1/2005 | Gota et al. |
| 8,940,847 B2 | 1/2015 | Cavallin |
| 9,365,731 B2 | 6/2016 | Jhaveri et al. |
| 2006/0135709 A1 | 6/2006 | Hasegawa et al. |
| 2015/0166803 A1 | 6/2015 | Jhaveri et al. |
| 2016/0032138 A1 | 2/2016 | Avramidis |
| 2017/0166706 A1* | 6/2017 | Anderson ............ C09D 133/08 |

FOREIGN PATENT DOCUMENTS

| | | | |
|---|---|---|---|
| CN | 102471418 A | 5/2012 | |
| CN | 105246932 A | 1/2016 | |
| CN | 106133051 A | 11/2016 | |
| WO | WO-2013113934 A1 | 8/2013 | |
| WO | WO-2014140016 A1 | 9/2014 | |
| WO | WO-2015116916 A1 * | 8/2015 | ............ C08F 212/08 |

OTHER PUBLICATIONS

International Search Report for PCT/US2019/017953 mailed May 22, 2019.
Written Opinion of the International Searching Authority for PCT/US2019/017953 mailed May 22, 2019.

* cited by examiner

*Primary Examiner* — Deve V Hall
(74) *Attorney, Agent, or Firm* — Faegre Drinker Biddle & Reath LLP (57) ABSTRACT

Described herein are methods of making a composition, the method comprising polymerizing monomers comprising a hydrophobic monomer in the presence of a solid grade oligomer, thereby forming a (co)polymer derived from the hydrophobic monomer, wherein the (co)polymer is derived from 5% by weight to 100% by weight of the hydrophobic monomer based on the total monomer weight. The hydrophobic monomer has a solubility in water of 0.2 g/100 g or less as measured at 20° C. The hydrophobic monomer comprises a substituted or unsubstituted $C_{10}$-$C_{22}$ alkyl (meth)acrylate, a substituted or unsubstituted $C_8$-$C_{20}$ alkenyl (meth)acrylate, a substituted or unsubstituted $C_5$-$C_{12}$ cycloalkyl (meth)acrylate, or a combination thereof. In some examples, the hydrophobic monomer can comprise lauryl (meth)acrylate, stearyl (meth)acrylate, heptadecyl (meth)acrylate, linoleyl (meth)acrylate, behenyl acrylate, cyclohexyl (meth)acrylate, isodecyl (meth)acrylate), nonyl (meth)acrylate, tridecyl (meth)acrylate, pentadecyl (meth)acrylate, 3-methylbut-2-enyl methacrylate, 3,7-dimethylocta-2,6-dienyl (meth)acrylate, or a combination thereof.

23 Claims, 1 Drawing Sheet

(CO)POLYMERS OF HYDROPHOBIC MONOMERS AND METHODS OF MAKING AND USE THEREOF

CROSS-REFERENCE TO RELATED APPLICATIONS

This application is a national stage application (under 35 U.S.C. § 371) of PCT/US2019/017953, filed Feb. 14, 2019, which claims benefit of U.S. Application No. 62/631,554, filed Feb. 16, 2018, both of which are incorporated herein by reference in their entirety.

TECHNICAL FIELD

The present disclosure relates to compositions comprising a (co)polymer derived from polymerizing a hydrophobic monomer in the presence of a solid grade oligomer (SGO). The present disclosure also relates to methods of making the disclosed compositions.

BACKGROUND

Emulsion polymers or polymer dispersions are used in a variety of industrial applications including the paper coatings, printing inks, decorative and protective coatings, automotive coatings, adhesives and construction, fiber bonding, asphalt modification, or leather. These polymers rely on a variety of monomers to achieve the desired glass transition temperature and hydrophilic/hydrophobic properties. Polymers containing monomers with highly hydrophobic chains are often desired to improve water resistance, adhesion, chemical resistance, tensile/elongational strength, or rheological properties.

Emulsion polymerization relies on monomer diffusion from monomer droplets through the aqueous phase and into the growing polymer particle. However, the diffusion rate of highly hydrophobic monomers through the aqueous phase is so low that these monomers do not copolymerize efficiently resulting in a high amount of unreacted monomer at the conclusion of the polymerization. A process technique to circumvent the water transport issue of highly hydrophobic monomers is to produce mini- or nano-emulsions, in which particles are formed by droplet nucleation. In turn, droplet nucleation can take place if the surface area of the monomer droplets is larger compared to the surface area of the micelles and this requires special techniques such as miniemulsion polymerization. However, this process requires high shear achieved by high power ultrasound or with a high-pressure homogenizer. Therefore, finding a way to conduct more efficient polymerization processes for formulations including hydrophobic monomers is needed.

SUMMARY

Described herein are methods of making a composition, the method comprising polymerizing monomers comprising a hydrophobic monomer in the presence of a solid grade oligomer, thereby forming a (co)polymer derived from the hydrophobic monomer, wherein the (co)polymer is derived from greater than 5% by weight to 100% by weight of the hydrophobic monomer based on the total monomer weight (e.g., from 5% to 40%, from 50% to 100%. Or from 40% to 70%). The hydrophobic monomer has a solubility in water of 0.2 g/100 g or less as measured at 20° C. The hydrophobic monomer comprises a substituted or unsubstituted $C_{10}$-$C_{22}$ alkyl (meth)acrylate, a substituted or unsubstituted $C_8$-$C_{20}$ alkenyl (meth)acrylate, a substituted or unsubstituted $C_5$-$C_{12}$ cycloalkyl (meth)acrylate, or a combination thereof. In some examples, the hydrophobic monomer can comprise lauryl (meth)acrylate, stearyl (meth)acrylate, heptadecyl (meth)acrylate, linoleyl (meth)acrylate, behenyl acrylate, cyclohexyl (meth)acrylate, isodecyl (meth)acrylate), nonyl (meth)acrylate, tridecyl (meth)acrylate, pentadecyl (meth)acrylate, 3-methylbut-2-enyl methacrylate, 3,7-dimethylocta-2,6-dienyl (meth)acrylate, or a combination thereof. The residual amount of the hydrophobic monomer after the polymerization of the (co)polymer can, for example, be 1000 ppm or less.

In some examples, the hydrophobic monomer further comprises styrene, butadiene, a vinyl ester having a solubility in water of 0.2 g/100 g or less as measured at 20° C., a (meth)acrylate having a solubility in water of 0.2 g/100 g or less as measured at 20° C., or a combination thereof. In some examples, the hydrophobic monomer further comprises styrene, butadiene, butyl acrylate, or a combination thereof.

In certain examples, the hydrophobic monomer comprises heptadecyl (meth)acrylate, the (co)polymer is derived from greater than 5% to 40% by weight of heptadecyl (meth)acrylate based on the total monomer weight, and the hydrophobic monomer does not include butadiene. In certain examples, the hydrophobic monomer includes butadiene and the (co)polymer is derived from 50% or more by weight of the hydrophobic monomer.

In some examples, the method further comprises polymerizing a non-hydrophobic monomer with the hydrophobic monomer. The non-hydrophobic monomer can, for example, further comprise a (meth)acrylate having a solubility in water of greater than 0.2 g/100 g, a (meth)acrylic acid having a solubility in water of greater than 0.2 g/100 g as measured at 20° C., a (meth)acrylamide having a solubility in water of greater than 0.2 g/100 g as measured at 20° C., a hydroxy functional (meth)acrylate having a solubility in water of greater than 0.2 g/100 g as measured at 20° C., or a combination thereof. In some examples, the non-hydrophobic monomer can include methyl methacrylate.

The solid grade oligomer can, for example, comprise a styrene-acrylic resin or pure acrylic resin. In some examples, the solid grade oligomer can comprise a styrene-acrylic resin and the solid grade oligomer is derived from styrene, α-methyl styrene, or a combination thereof. The solid grade oligomer can, in some examples, be further derived from a carboxylic acid monomer, or a salt or ester thereof. In some examples, the carboxylic acid monomer includes acrylic acid. In certain examples, the solid grade oligomer comprises an amine salt of a modified acrylic copolymer, an ammonium salt of a modified acrylic copolymer, or a combination thereof. In some examples, the solid grade oligomer comprises 5-40 wt % acid functional repeat units.

The (co)polymer can, in some examples, be polymerized in the presence of a surfactant. The surfactant can, for example, comprise a non-ionic surfactant, an anionic surfactant, or a combination thereof. In some examples, the surfactant can comprise a non-ionic surfactant and an anionic surfactant. In some examples, the surfactant can comprise a copolymerizable surfactant.

In some examples, the (co)polymer is polymerized in the presence of a chain transfer agent. In some examples, the monomers are polymerized in an aqueous medium using emulsion polymerization. The monomers can, for example, be polymerized at a polymerization temperature of from 50° C. to 90° C. In some examples, the monomers are fed over a period of from 2 to 6 hours.

Also described herein are the (co)polymers made by the methods described herein.

Also disclosed herein are aqueous dispersions comprising water and the (co)polymers described herein. Also disclosed herein are aqueous dispersions comprising a solid grade oligomer and a (co)polymer polymerized in the presence of the solid grade oligomer, wherein the (co)polymer is derived from a hydrophobic monomer having a solubility in water of 0.2 g/100 g or less as measured at 20° C., wherein the hydrophobic monomer comprises a substituted or unsubstituted $C_{10}$-$C_{22}$ alkyl (meth)acrylate, a substituted or unsubstituted $C_8$-$C_{20}$ alkenyl (meth)acrylate, a substituted or unsubstituted $C_5$-$C_{12}$ cycloalkyl (meth)acrylate, or a combination thereof; and, wherein the (co)polymer is derived from greater than 5% by weight to 100% by weight of the hydrophobic monomer based on the total monomer weight. In some examples, the aqueous dispersion comprises a plurality of (co)polymer particles having an average particle size of from 40 nanometers (nm) to 500 nm.

Also described herein are formulations comprising the aqueous dispersions described herein, for example, coating formulations, adhesive formulations, asphalt compositions, and carpet compositions.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The accompanying drawings, which are incorporated and constitute a part of this specification, illustrate several aspects of the disclosure, and together with the description, serve to explain the principles of the disclosure.

DETAILED DESCRIPTION

The compositions and methods described herein may be understood more readily by reference to the following detailed description of specific aspects of the disclosed subject matter and the examples included therein.

In this specification and in the claims that follow, reference will be made to a number of terms, which shall be defined to have the following meanings.

Throughout the description and claims of this specification, the words "comprise," "include," and other forms of these words, such as "comprising," "comprises," "including," and "includes" are open, non-limiting terms and do not exclude additional elements such as, for example, additional additives, components, integers, or steps. Although the terms "comprising" and "including" have been used herein to describe various embodiments, the terms "consisting essentially of" and "consisting of" can be used in place of "comprising" and "including" to provide for more specific embodiments and are also disclosed.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "(meth)acryl . . . " includes "acryl . . . ," "methacryl . . . ," or mixtures thereof.

The term "(co)polymer" includes homopolymers, copolymers, or mixtures thereof.

Described herein are methods of making a composition, the methods comprising polymerizing monomers comprising a hydrophobic monomer in the presence of a solid grade oligomer, thereby forming a (co)polymer derived from the hydrophobic monomer. As used herein, a "hydrophobic monomer" comprises a monomer having a water solubility of less than 0.2 g/100 g water at 20° C.

The hydrophobic monomer comprises a substituted or unsubstituted $C_{10}$-$C_{22}$ alkyl (meth)acrylate, a substituted or unsubstituted $C_8$-$C_{20}$ alkenyl (meth)acrylate, a substituted or unsubstituted $C_5$-$C_{12}$ cycloalkyl (meth)acrylate, or a combination thereof. The hydrophobic monomer can be linear or branched. In some examples, the hydrophobic monomer comprises lauryl (meth)acrylate, stearyl (meth)acrylate, heptadecyl (meth)acrylate, linoleyl (meth)acrylate, behenyl acrylate, cyclohexyl (meth)acrylate, isodecyl (meth)acrylate, nonyl (meth)acrylate, tridecyl (meth)acrylate, pentadecyl (meth)acrylate, 3-methylbut-2-enyl methacrylate, 3,7-dimethylocta-2,6-dienyl (meth)acrylate, or a combination thereof.

The solubility of the hydrophobic monomer in water, measured at 20° C., can be 0.2 g/100 g water or less, 0.15 g/100 g water or less, 0.1 g/100 g water or less, 0.05 g/100 g water or less, 0.03 g/100 g water or less, or 0.01 g/100 g water or less. Solubilities can be provided, e.g., from D. R. Bassett, "Hydrophobic Coatings for Emulsion Polymers," Journal of Coatings Technology, January 2001, or High Polymers Vol. IX: Emulsion Polymerization, F. A. Bovey, I. M. Kolthoff, A. I. Medalia and E. J. Meehan, p. 156, 1954.

The solubility and partitioning coefficients of certain example hydrophobic monomers are shown below in Table 1.

TABLE 1

Partitioning coefficient and solubility of certain hydrophobic monomers.

| Monomer | Partitioning Coefficient n-octanol/water [log $K_{ow}$ at 25° C.] | Water Solubility at 20° C. [g/L at 20° C.] |
|---|---|---|
| Heptadecyl acrylate (C17 A) | 9.2 | 0.04 |
| Lauryl Acrylate (LA) | 6.13 | 0.04 |
| Stearyl Acrylate (SA) | 9.28 | — |
| Cyclohexyl methacrylate (CHMA) | 3.54 | 0.1 |
| Heptadecyl methacrylate (C17 MA) | 6.5 | 0.05 |
| Lauryl Methacrylate (LMA) | 6.45 | 0.03 |
| Stearyl Methacrylate (SMA) | 9.62 | <0.01 |

The (co)polymer can be derived from one or more additional hydrophobic monomers having a solubility in water, measured at 20° C., of 0.2 g/100 g water or less. For example, suitable additional hydrophobic monomers include butyl acrylate (0.16 g/100 g water); butadiene (0.08 g/100 g water); styrene (0.03 g/100 g water); 2-ethylhexyl acrylate (0.01 g/100 g water); vinyl neo-pentanoate (0.08 g/100 g water); vinyl 2-ethylhexanoate (less than 0.01 g/100 g water); vinyl neo-nonanoate (less than 0.001 g/100 g water); vinyl neo-decanoate (less than 0.001 g/100 g water); vinyl neo-undecanoate (less than 0.001 g/100 g water); and vinyl neo-dodecanoate (less than 0.001 g/100 g water).

The additional hydrophobic monomer can, for example, comprise styrene, butadiene, a vinyl ester having a solubility in water of 0.2 g/100 g or less as measured at 20° C., a (meth)acrylate having a solubility in water of 0.2 g/100 g or less as measured at 20° C., or a combination thereof. For example, the additional hydrophobic monomer can include styrene, butadiene, butyl acrylate, 2-ethylhexyl acrylate, or a combination thereof.

The (co)polymer is derived from greater than 5% by weight of the hydrophobic monomer based on the total monomer weight (e.g., 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, or 90% or more). In some examples, the (co)polymer is derived from 100% by weight or less of the hydrophobic monomer based on the total monomer weight (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, or 15% or less). The amount of hydrophobic monomer the (co)polymer is derived from can range from any of the minimum values described above to any of the maximum values described above. For example, the (co)polymer can be derived from greater than 5% by weight to 100% by weight of the hydrophobic monomer based on the total monomer weight (e.g., from greater than 5% to 50%, from 50% to 100%, from greater than 5% to 20%, from 20% to 40%, from 40% to 60%, from 60% to 80%, from 60% to 100%, from 80% to 100%, from greater than 5% to 40%, or from 40% to 70%).

The residual amount of the hydrophobic monomer after the polymerization of the (co)polymer can, for example, be 1000 ppm or less as determined by direct injection gas chromatography methods (e.g., 900 ppm or less, 800 ppm or less, 700 ppm or less, 600 ppm or less, 500 ppm or less, 400 ppm or less, 300 ppm or less, 200 ppm or less, or 100 ppm or less).

In certain examples, the hydrophobic monomer comprises heptadecyl (meth)acrylate, the (co)polymer is derived from greater than 5% to 40% by weight of heptadecyl (meth) acrylate based on the total monomer weight, and the (co) polymer does not include butadiene. In certain examples, the hydrophobic monomer includes butadiene and the copolymer is derived from 50% or more by weight of the hydrophobic monomer based on the total monomer weight.

In some examples, the methods further comprise polymerizing a non-hydrophobic monomer (i.e., a monomer having a solubility in water of greater than 0.2 g/100 g as measured at 20° C.) with the hydrophobic monomer to form the (co)polymer. The non-hydrophobic monomer can, for example, comprise a (meth)acrylate having a solubility in water of greater than 0.2 g/100 g as measured at 20° C., a (meth)acrylic acid having a solubility in water of greater than 0.2 g/100 g as measured at 20° C., a vinyl ester having a solubility in water of greater than 0.2 g/100 g as measured at 20° C., a (meth)acrylamide having a solubility in water of greater than 0.2 g/100 g as measured at 20° C., a hydroxy functional (meth)acrylate having a solubility in water of greater than 0.2 g/100 g as measured at 20° C., or a combination thereof. In some examples, the non-hydrophobic monomers include methyl (meth)acrylate, (meth)acrylic acid, maleic acid, itaconic acid, fumaric acid, (meth)acrylamide, 2-hydroxyethyl methacrylate, hydroxypropyl (meth) acrylate, and combinations thereof.

In some examples, the (co)polymer can be derived from 0.1% or more by weight of a non-hydrophobic monomer, based on the total monomer weight (e.g., 0.5% or more, 1% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, or 8% or more). In some examples, the (co)polymer can be derived from 10% or less by weight of a non-hydrophobic monomer, based on the total monomer weight (e.g., 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.5% or less, or 1% or less). The amount of non-hydrophobic monomer the (co) polymer is derived from can range from any of the minimum values described above to any of the maximum values described above. For example, the (co)polymer can be derived from 0.1% by weight to 10% by weight of the non-hydrophobic monomer based on the total monomer weight (e.g., from 0.1% to 5%, from 5% to 10%, from 0.1% to 2%, from 2% to 4%, from 4% to 6%, from 6% to 8%, from 8% to 10%, from 0.5% to 9.5%, or from 1% to 9%).

In some embodiments, the hydrophobic monomer and optional non-hydrophobic monomer can be polymerized to form a styrene-acrylic copolymer, a styrene-butadiene copolymer, a carboxylated styrene-butadiene copolymer, or a pure acrylic copolymer that includes the $C_{10}$-$C_{22}$ alkyl (meth)acrylate, a substituted or unsubstituted $C_8$-$C_{20}$ alkenyl (meth)acrylate, a substituted or unsubstituted $C_5$-$C_{12}$ cycloalkyl (meth)acrylate, or a combination thereof.

In some examples, the (co)polymer can be derived from one or more additional monomers. Exemplary additional monomers include other vinylaromatic compounds (e.g., α-methylstyrene, o-chlorostyrene, and vinyltoluenes); isoprene; (meth)acrylonitrile; α,β-monoethylenically unsaturated mono- and dicarboxylic acids in addition to those described above (e.g., citraconic acid, styrene carboxylic acid, crotonic acid, dimethacrylic acid, ethylacrylic acid, allylacetic acid, vinylacetic acid, mesaconic acid, methylenemalonic acid, and citraconic acid); esters of α,β-monoethylenically unsaturated mono- and dicarboxylic acids having 3 to 6 carbon atoms with alkanols having 1 to 12 carbon atoms in addition to those described above (e.g., esters of acrylic acid, methacrylic acid, maleic acid, fumaric acid, oritaconic acid, with alkanols to produce, e.g., n-butyl acrylate, isobutyl acrylate, n-butyl maleate, n-ethyl acrylate, and dimethyl maleate); anhydrides of α,β-monoethylenically unsaturated monocarboxylic and dicarboxylic acids (e.g., maleic anhydride, itaconic anhydride, and methylmalonic anhydride); (meth)acrylamide; alkyl-substituted acrylamides (e.g., N-tert-butylacrylamide and N-methyl(meth)acrylamide); vinyl and vinylidene halides (e.g., vinyl chloride and vinylidene chloride); vinyl esters of $C_1$-$C_{18}$ monocarboxylic or dicarboxylic acids in addition to those described above (e.g., vinyl acetate, vinyl propionate, vinyl n-butyrate, vinyl laurate and vinyl stearate); $C_1$-$C_4$ hydroxyalkyl esters of $C_3$-$C_6$ monocarboxylic or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); and monomers containing glycidyl groups (e.g., glycidyl methacrylate), linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers (e.g., phosphoethyl (meth)acrylate); alkylaminoalkyl (meth)acrylates or alkylaminoalkyl(meth)acrylamides or quaternization products thereof (e.g., 2-(N,N-dimethylamino)ethyl (meth)acrylate, 3-(N,N-dimethylamino)propyl (meth)acrylate, 2-(N,N,N-trimethylammonium)ethyl (meth) acrylate chloride, 2-dimethylaminoethyl(meth)acrylamide, 3-dimethylaminopropyl(meth)acrylamide, and 3-trimethylammoniumpropyl(meth)acrylamide chloride); allyl esters of $C_1$-$C_{30}$ monocarboxylic acids; N-Vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g., acetoacetoxyethyl(meth)acrylate or diacetonacrylamide; monomers containing urea groups (e.g., ureidoethyl (meth)acrylate, acrylamidoglycolic acid, and methacrylamidoglycolate methyl ether); monoalkyl itaconates; monoalkyl maleates; hydrophobic branched ester monomers; monomers containing silyl groups (e.g., trimethoxysilylpropyl methacrylate), vinyl esters of branched mono-carboxylic acids having a total of 8 to 12 carbon atoms in the acid residue moiety and 10 to 14 total carbon atoms in addition to those described above, and copolymerizable surfactant monomers (e.g., those sold under the trademark ADEKA REASOAP).

The (co)polymers disclosed herein can also be derived from a crosslinking agent. Exemplary crosslinking agents include, but are not limited to, N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking agents can include, for instance, diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate, butanediol diacrylate, trimethylolpropane triacrylate, and methylenebisacrylamide. Other exemplary crosslinking agents include post-film forming crosslinkers, such as 2-acetoacetoxyethyl methacrylate (AAEM) and diacetone acrylamide (DAAM). In some examples, the crosslinking agents can include alkylene glycol diacrylates and dimethacrylates, and/or divinylbenzene.

The amount of crosslinking agent employed can be 0.05% or more based on the total amount of the monomers to be polymerized (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.6% or more, 1.7% or more, 1.8% or more, 1.9% or more, 2% or more, 2.5% or more, 3% or more, 3.5% or more, or 4% or more). In some examples, the amount of crosslinking agent employed can be 5% or less based on the total amount of the monomers to be polymerized (e.g., 4.5% or less, 4% or less, 3.5% or less, 3% or less, 2.5% or less, 2% or less, 1.9% or less, 1.8% or less, 1.7% or less, 1.6% or less, 1.5% or less, 1.4% or less, 1.3% or less, 1.2% or less, 1.1% or less, 1% or less, 0.9% or less, 0.8% or less, 0.7% or less, 0.6% or less, 0.5% or less, 0.4% or less, 0.3% or less, or 0.2% or less). The amount of crosslinking agent employed can range from any of the minimum values described above to any of the maximum values described above. For example, the amount of crosslinking agent employed can be from 0.05% to 5% based on the total amount of monomers to be polymerized (e.g., from 0.05% to 2.5%, from 2.5% to 2%, from 0.05% to 0.5%, from 0.5% to 1%, from 1% to 1.5%, from 1.5% to 2%, from 2% to 2.5%, from 2.5% to 3%, from 3% to 3.5%, from 3.5% to 4%, from 4% to 4.5%, from 4.5% to 5%, from 0.05% to 4%, from 0.05% to 3%, or from 0.05% to 2%).

The methods comprise polymerizing monomers comprising a hydrophobic monomer in the presence of a solid grade oligomer. The term solid grade oligomer (SGO), as used herein, refers to a high solids oligomer which upon neutralization dissolves in water. Solid grade oligomers are described, for example, in U.S. Pat. Nos. 9,365,731; 8,940,847; U.S. Patent Application No. 2006/0135709; and International Patent Application No. WO 2013/113934. Several commercially solid grade oligomers are available from BASF Corporation under the trademark Joncryl®.

Solid grade oligomers can be prepared by solid grade oligomer polymerization process, described, for example, in U.S. Pat. Nos. 4,529,787; 4,546,160; and 4,414,370. The solid grade oligomer polymer technology is a continuous bulk polymerization technology. With this method, an oligomer with a comparatively small molecular weight (typically greater than 1,000 Daltons and less than 25,000 Daltons) can be made. This process results in narrow molecular weight distributions and excellent batch-to-batch consistency, compared to oligomers or polymers produced by conventional polymerization methods. Solid grade oligomers are described, for example in International Patent Application No. WO 2014/140016, which is hereby incorporated herein by reference in its entirety.

Without wishing to be bound by theory, it is believed that the solid grade oligomer can impact the polymerization of the hydrophobic monomer by two mechanisms: (1) by increasing the solubility of the hydrophobic monomer, thus facilitating transport of the hydrophobic monomer through the aqueous phase to the particles; and (2) by creating new particles (i.e., increasing particle nucleation in excess of what is achieved by micellar nucleation and/or a seed latex). Both of these factors would explain the observed increase in reaction rate of the polymerization process. Accordingly, the solid grade oligomer can be chosen from any solid grade oligomer that increases the solubility of the hydrophobic monomer, creates new particles during polymerization, or a combination thereof. The solid grade oligomer can be chosen from any solid grade oligomer that allows for decreased polymerization pressure when polymerizing hydrophobic monomers that are gaseous at the polymerization temperature employed without increasing reaction time or temperature.

The solid grade oligomers used herein can be neutralized with a base (e.g., ammonium hydroxide), and as such are water soluble. It is the solubilized form of the solid grade oligomers that can participate in the emulsion polymerization process of the (co)polymers described herein. In particular, the solubilized solid grade oligomers have surfactant-like properties and as such can perform as a stabilizing species for the (so)polymer particles in the emulsion polymerization process and/or as particle generators in the emulsion polymerization. For example, the solubilized solid grade oligomer can react by grafting onto a (co)polymer particle surface, thereby providing electro-steric stabilization to the (co)polymer, enhancing the solubility of the other monomers present in the polymerization, or generating new particles by forming aggregates (e.g., via nucleation) in the aqueous phase. The solid grade oligomers can cause an increase in reaction rate of the polymerization of the (co) polymers described herein.

The solid grade oligomer can comprise, for example, a styrene-acrylic resin or pure acrylic resin. In some examples, the solid grade oligomer includes an ammonium salt of a modified acrylic (co)polymer, an amine salt of a modified acrylic (co)polymer, or a combination thereof. In some examples, the solid grade oligomer is derived from styrene and α-methyl styrene and includes carboxyl groups. In some examples, the solid grade oligomer comprises a styrene-acrylic resin and the solid grade oligomer is derived from styrene, α-methyl styrene, or a combination thereof. In some examples, the solid grade oligomer is further derived from a monomer that provides carboxyl groups, such as carboxylic acid monomer, or a salt or ester thereof. The carboxylic acid monomer can include, for example, acrylic acid. In some examples, the solid grade oligomer comprises about 33% styrene, about 33% α-methyl styrene, and about 33% acrylic acid.

In some examples, the solid grade oligomer comprises 5 wt % or more acid functional repeat units (e.g., 10 wt % or more, 15 wt % or more, 20 wt % or more, 25 wt % or more, or 30 wt % or more). In some examples, the solid grade oligomer comprises 40 wt % or less acid functional repeat units (e.g., 35 wt % or less, 30 wt % or less, 25 wt % or less, 20 wt % or less, or 15 wt % or less). The amount of acid functional repeat units in the solid grade oligomer can range from any of the minimum values described above to any of the maximum values described above. For example, the solid grade oligomer can comprise from 5 wt % to 40 wt % acid functional repeat units (e.g., from 5 wt % to 20 wt %, from 20 wt % to 40 wt %, from 5 wt % to 15 wt %, from 15 wt % to 25 wt %, from 25 wt % to 40 wt %, or from 10 wt % to 30 wt %).

Exemplary solid grade oligomers include, but are not limited to, SGO Resin B-98 (BASF Corp.), SGO Resin E-08 (BASF Corp.), SGO Resin E-26 (BASF Corp.), SGO Resin B-38 (BASF Corp.), SGO Resin B-39 (BASF Corp.), and SGO Resin B-57 (BASF Corp.).

In some examples, the (co)polymer can be polymerized in the presence of from 0.1%-99% by weight solid grade oligomer (e.g., from 0.5%-50%, from 1% to 25%, from 8%-25%, from 10%-25%, from 13%-24.5%, from 16%-24%, or from 17%-23%). The (co)polymer can be polymerized in the presence of the solid grade oligomer in an aqueous medium.

In some examples, the methods can further comprise polymerizing the (co)polymer in the presence of a surfactant. In some examples, the composition can include one or more surfactants (emulsifiers). The surfactant can include, for example, a non-ionic surfactant, an anionic surfactant, or a combination thereof. In some examples, the surfactant comprises a non-ionic surfactant and an anionic surfactant. In some examples, the surfactant can include a copolymerizable surfactant.

Suitable nonionic surfactants include, but are not limited to, polyoxyalkylene alkyl ethers and polyoxyalkylene alkylphenyl ethers (e.g., diethylene glycol monoethyl ether, diethylene glycol diethyl ether, polyoxyethylene lauryl ether, polyoxyethylene stearyl ether, and polyoxyethylene nonylphenyl ether); oxyethylene-oxypropylene block copolymers; sorbitan fatty acid esters (e.g., sorbitan monolaurate available as SPAN® 20 from Merck Schuchardt OHG, sorbitan monooleate available as SPAN® 80 from Merck Schuchardt OHG, and sorbitan trioleate available as SPAN® 85 from Merck Schuchardt OHG); polyoxyethylene sorbitan fatty acid esters (e.g., polyoxyethylene sorbitan monolaurate available as TWEEN® 20 and TWEEN® 21 from Uniqema, polyoxyethylene sorbitan monopalmitate available as TWEEN® 40 from Uniqema, polyoxyethylene sorbitan monostearate available as TWEEN® 60, TWEEN® 60K, and TWEEN® 61 from Uniqema, polyoxyethylene sorbitan monooleate available as TWEEN® 80, TWEEN® 80K, and TWEEN® 81 from Uniqema, and polyoxyethylene sorbitan trioleate available as TWEEN® 85 from Uniqema); polyoxyethylene sorbitol fatty acid esters (e.g., tetraoleic acid polyoxyethylene sorbitol); glycerin fatty acid esters (e.g., glycerol monooleate); polyoxyethylene glycerin fatty acid esters (e.g., monostearic acid polyoxyethylene glycerin and monooleic acid polyoxyethylene glycerin); polyoxyethylene fatty acid esters (e.g., polyethylene glycol monolaurate and polyethylene glycol monooleate); polyoxyethylene alkylamine; and acetylene glycols. In some examples, the nonionic surfactant can have a HLB (hydrophilic lipophilic balance) at room temperature such that 8<HLB<15. In some examples, the HLB is 14 or less. In some examples, the nonionic surfactant includes an ethylene oxide $(EO)_m$ and/or propylene oxide (PO), adduct of an alkyl, alkylbenzene or dialkylbenzene alcohol wherein (m+n)≤ 14, (m+n)≤ 12, or (m+n)≤ 10 (e.g., 6≤ (m+n)≤ 10), such as those available from BASF under the LUTENSOL™ trademark.

Suitable anionic emulsifiers include fatty acids, alkyl sulfates, alkyl ether sulfates, alkyl benzene sulfonic acid, alkyl phosphoric acid or salts thereof, and sucrose esters. Anionic polyelectrolytes such as tartrates, borates, oxalates and phosphates, can also be used in the composition. Additional suitable anionic surfactants and polyelectrolytes include but are not limited to M28B and other anionic surfactants available from MeadWestvaco under the INDULIN® trademark (such as INDULIN® AMS, INDULIN® SA-L, INDULIN® ISE, INDULIN® 201, INDULIN® 202, and INDULIN® 206); anionic surfactants available from Akzo Nobel under the REDICOTE® trademark (such as REDICOTE® E-15 and REDICOTE® E-62C); and ligno-sulfonates such as those available under the MARASPERSE™ trademark (such as MARASPERSE™ CBOS-3 and MARASPERSE™ N22). In some examples, the emulsifier includes an anionic fatty acid-based emulsifier.

The copolymerizable surfactants can comprise an olefinically unsaturated group that can participate in a free radical polymerization. Suitable polymerizable surfactants include hemi-esters of maleic anhydride of the formula $M^+$-OOC—CH═CHCOOR wherein R is $C_{6-22}$ alkyl and $M^+$ is $Na^+$, $K^+$, $Li^+$, $NH_4^+$, or a protonated or quaternary amine.

In some examples, copolymerizable surfactants suitable for use in the copolymer can have the formula I:

(I)

wherein n stands for a number of from 0 to 1,000. Exemplary copolymerizable surfactants can include the HITENOL® BC series (Dai-Ichi Kogyo Seiyaku Co., Ltd.), such as DC-10, BC-1025, BC-20, BD-2020, and BC-30.

In some examples, copolymerizable surfactants suitable for use in the copolymer can have the formula II:

(II)

wherein n stands for a number of from 0 to 1,000. Exemplary copolymerizable surfactants can include the NOIGEN® RN series (Dai-Ichi Kogyo Seiyaku Co., Ltd.), such as RN-10, RN-20, RN-30, RN-40, and RN-5065.

In some examples, copolymerizable surfactants suitable for use in the copolymer can have the formula III:

(III)

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, $R^2$ and $R^3$ each independently represents a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000. Suitable copolymerizable surfactants are described in U.S. Pat. No. 6,841,655, which is hereby incorporated by reference in its entirety.

In some examples, the copolymerizable surfactants can be provided according to Formula IIIa:

(IIIa)

wherein $R^1$ is $C_9$-$C_{15}$ alkyl or $C_7$-$C_{11}$ alkyl-phenyl, X is H, $SO_3NH_4$ and/or $SO_3Na$, and m is 3 to 50. In some examples, $R^1$ is $C_{10}$-$C_{14}$ alkyl, X is H and/or $SO_3NH_4$, and m is 5 to 40. In some examples, m is 5 to 25, 5 to 20, or 5 to 15 (e.g., m=10). Exemplary copolymerizable surfactants wherein $R^1$ is $C_{10}$-$C_{14}$ alkyl can include ADEKA REASOAP series ER and SR surfactants (Asahi Denka Co., Ltd.), such as ER-10, ER-20, ER-30, ER-40, SR-10, SR-20, and SR-1025. For example, ADEKA REASOAP SR-10, which includes ammonium salts of poly(oxy-1,2-ethanediyl), alpha-sulfo-omega-[1-(hydroxymethyl)-2-(2-propenyloxy)ethoxy]-, $C_{11}$-rich, $C_{10}$-$C_{14}$-branched alkyl ethers, can be used. Exemplary copolymerizable surfactants in which $R^1$ is $C_7$-$C_{11}$ alkyl-phenyl can include ADEKA REASOAP series NE and SE surfactants, such as NE-10, NE-20, NE-30, NE-40, NE-50, SE-10N, SE-20N, and SE-1025N.

Other representative copolymerizable surfactants can include MAXEMUL™ 6112, MAXEMUL™ 5011, MAXEMUL™ 5010 (all available from Croda Industrial Specialties) and allylsulfosuccinate derivatives (such as TREM LT-40™ (available from Henkel)).

The amount of the surfactant employed can be 0.1% or more based on the total amount of the monomers to be polymerized (e.g., 0.2% or more, 0.3% or more, 0.4% or more, 0.5% or more, 1% or more, 1.5% or more, 2% or more, 2.5% or more, 3% or more, 3.5% or more, or 4% or more). In some examples, the amount of surfactant employed can be 5% or less based on the total amount of the monomers to be polymerized (e.g., 4.5% or less, 4% or less, 3.5% or less, 3% or less, 2.5% or less, 2% or less, 1.5% or less, 1% or less, or 0.5% or less). The amount of the surfactant employed can range from any of the minimum values described above to any of the maximum values described above. For example, the amount of the surfactant employed can be from 0.1 to 5%, based on the total amount of the monomers to be polymerized (e.g., from 0.1% to 2.5%, from 2.5% to 5%, from 0.1% to 1%, from 1% to 2%, from 2% to 3%, from 3% to 4%, from 4% to 5%, or from 0.5% to 4.5%).

As described herein, the monomers in the (co)polymer can, in some examples, be polymerized in the presence of a chain transfer agent. A "chain transfer agent" as used herein refers to chemical compounds that are useful for controlling the molecular weights of polymers, for reducing gelation when polymerizations involving diene monomers are conducted, and/or for preparing polymers and copolymers with useful chemical functionality at their chain ends. The chain transfer agent reacts with a growing polymer radical, causing the growing chain to terminate while creating a new reactive species capable of initiating polymerization. The phrase "chain transfer agent" is used interchangeably with the phrase "molecular weight regulator."

Suitable chain transfer agents for use during polymerization of the (co)polymers disclosed herein can include compounds having a carbon-halogen bond, a sulfur-hydrogen bond, a silicon-hydrogen bond, or a sulfur-sulfur bond; an allyl alcohol, or an aldehyde. In some examples, the chain transfer agents contain a sulfur-hydrogen bond, and are known as mercaptans. In some examples, the chain transfer agent can include $C_3$-$C_{20}$ mercaptans. Specific examples of the chain transfer agent can include octyl mercaptan such as n-octyl mercaptan and t-octyl mercaptan, decyl mercaptan, tetradecyl mercaptan, hexadecyl mercaptan, dodecyl mercaptan such as n-dodecyl mercaptan and t-dodecyl mercaptan, tert-butyl mercaptan, mercaptoethanol such as B-mercaptoethanol, 3-mercaptopropanol, mercaptopropyltrimethoxy silane, tert-nonyl mercaptan, tert-dodecyl mercaptan, 6-mercaptomethyl-2-methyl-2-octanol, 4-mercapto-3-methyl-1-butanol, methyl-3-mercaptopropionate, butyl-3-mercaptopropionate, i-octyl-3-mercaptopropionate, i-decyl-3-mercaptopropionate, dodecyl-3-mercaptopropionate, octadecyl-3-mercaptopropionate, and 2-phenyl-1-mercapto-2-ethanol. Other suitable examples of chain transfer agents that can be used during polymerization of the (co)polymers include thioglycolic acid, methyl thioglycolate, n-butyl thioglycolate, i-octyl thioglycolate, dodecyl thioglycolate, octadecyl thioglycolate, ethylacrylic esters, terpinolene. In some examples, the chain transfer agent can include tert-dodecyl mercaptan.

The amount of the chain transfer agent employed can be 0.05% or more based on the total amount of the monomers to be polymerized (e.g., 0.1% or more, 0.15% or more, 0.2% or more, 0.25% or more, 0.3% or more, 0.35% or more, 0.4% or more, 0.45% or more, 0.5% or more, 0.6% or more, 0.7% or more, 0.8% or more, 0.9% or more, 1% or more, 1.25% or more, 1.5% or more, 1.75% or more, 2% or more, 2.25% or more, 2.5% or more, 3% or more, 3.5% or more, 4% or more, 4.5% or more, 5% or more, 5.5% or more, 6% or more, 6.5% or more, 7% or more, 7.5% or more, or 8% or more). In some examples, the amount of the chain transfer agent employed can be 10% or less based on the total amount of the monomers to be polymerized (e.g., 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 2.25% or less, 2% or less, 1.75% or less, 1.5% or less, 1.25% or less, 1% or less, 0.9% or less, 0.8% or less, 0.7% or less, 0.6% or less, 0.5% or less, 0.45% or less, 0.4% or less, 0.35% or less, 0.3% or less, 0.25% or less, or 0.2% or less). The amount of chain transfer agent employed can range from any of the minimum values described above to any of the maximum values described above. For example, the amount of the chain transfer agent employed can be from 0.05% to 10% based on the total amount of the monomers to be polymerized (e.g., from 0.05% to 5%, from 5% to 10%, from 0.05% to 2%, from 2% to 4%, from 4% to 6%, from 6% to 8%, from 8% to 10%, from 0.05% to 4%, from 0.05% to 3%, from 0.05% to 2%, or from 0.05% to 1%).

The compositions disclosed herein can be prepared by any polymerization method known in the art. In some examples, the compositions disclosed herein are prepared by a dispersion, a mini-emulsion, or an emulsion polymerization. The compositions disclosed herein can be prepared, for instance, by polymerizing the hydrophobic monomer in the presence of a solid grade oligomer using free-radical aqueous emulsion polymerization. In some examples, the polymerization medium is an aqueous medium. The aqueous medium can include water alone or a mixture of water and water-miscible liquids, such as methanol. In some examples, water is used alone. In some examples, the emulsion polymerization can be conducted as an aqueous emulsion comprising water, a hydrophobic monomer, a solid grade oligomer, an optional non-hydrophobic monomer, an optional surfactant, and an optional chain transfer agent.

The emulsion polymerization can be carried out either as a batch, semi-batch, or continuous process. In some examples, a portion of the monomers can be heated to the polymerization temperature and partially polymerized, and the remainder of the polymerization batch can be subsequently fed to the polymerization zone continuously, in steps or with superposition of a concentration gradient. The process can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-19.

A (co)polymer dispersion can be prepared by first charging a reactor with water, the hydrophobic monomer, the solid grade oligomer, and optionally non-hydrophobic monomers, chain transfer agent, surfactant, etc. A seed latex, though optional, can be included in the reactor to help initiate polymerization and helps produce a polymer having a consistent particle size. Any seed latex appropriate for the specific monomer reaction can be used such as a polystyrene seed. A protective colloid can also or alternatively be used in the polymerization process. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature.

The monomers can, for example, be polymerized at a polymerization temperature of 50° C. or more (e.g., 55° C. or more, 60° C. or more, 65° C. or more, 70° C. or more, 75° C. or more, or 80° C. or more). In some examples, the monomers can be polymerized at a polymerization temperature of 90° C. or less (e.g., 85° C. or less, 80° C. or less, 75° C. or less, 70° C. or less, 65° C. or less, or 60° C. or less). The polymerization temperature that the monomers are polymerized at can range from any of the minimum values described above to any of the maximum values described above. For example, the monomers can be polymerized at a polymerization temperature of from 50° C. to 90° C. (e.g., from 50° C. to 70° C., from 70° C. to 90° C., from 50° C. to 60° C., from 60° C. to 70° C., from 70° C. to 80° C., from 80° C. to 80° C., from 55° C. to 85° C., or from 60° C. to 80° C.).

After the initial charge, the monomers that are to be used in the polymerization can be continuously fed to the reactor in one or more monomer feed streams. The monomers can be supplied as a pre-emulsion in an aqueous medium. An initiator feed stream can be also continuously added to the reactor at the time the monomer feed stream is added although it may also be desirable to include at least a portion of the initiator solution to the reactor before adding a monomer pre-emulsion if one is used in the process. The monomer and initiator feed streams are typically continuously added to the reactor over a predetermined period of time (e.g., the feed time hours) to cause polymerization of the monomers and to thereby produce the polymer dispersion.

The monomers can be provided over a feed time of 2 hours or more (e.g., 2.5 hours or more, 3 hours or more, 3.5 hours or more, 4 hours or more, 4.5 hours or more, or 5 hours or more). In some examples, the monomers can be provided over a feed time of 6 hours or less (e.g., 5.5 hours or less, 5 hours or less, 4.5 hours or less, 4 hours or less, 3.5 hours or less, or 3 hours or less). The feed time can range from any of the minimum values described above to any of the maximum values described above. For example, the monomers can be provided over a feed time of from 2 hours to 6 hours (e.g., from 2 hours to 4 hours, from 4 hours to 6 hours, or from 3 hours to 5 hours).

A surfactant can be added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

As mentioned above, the monomer feed stream can include one or more monomers (e.g., the hydrophobic monomer) and the solid grade oligomer. The monomers can be fed in one or more feed streams with each stream including one or more of the monomers being used in the polymerization process. For example, the hydrophobic monomer; optional non-hydrophobic monomer; and solid grade oligomer; can be provided in separate monomer feed streams or can be added as a pre-emulsion. It can also be advantageous to delay the feed of certain monomers to provide certain polymer properties or to provide a layered or multiphase structure (e.g., a core/shell structure). In some examples, the (co)polymer is polymerized in multiple stages to produce particles having multiple phases. In some examples, the (co)polymer is polymerized in a single stage to produce a single phase particle. The (co)polymer can be a random copolymer including the monomers present in the polymerization process.

The molecular weight of the (co)polymers can be adjusted by adding a small amount of molecular weight regulators, for example, 0.01 to 4% by weight, based on the monomers being polymerized. Particular regulators which can be used include organic thio compounds (e.g., tert-dodecylmercaptan), allyl alcohols and aldehydes. In some embodiments, a molecular weight regulator is not used.

The initiator feed stream can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described, e.g., by A. S. Sarac in *Progress in Polymer Science* 24, 1149-1204 (1999). Exemplary initiators include azo initiators and aqueous solutions of sodium persulfate. The initiator stream can optionally include one or more buffers or pH regulators.

In addition to the monomers and initiator, a surfactant (i.e., emulsifier) such as those described herein can be fed to the reactor. The surfactant can be provided in the initial charge of the reactor, provided in the monomer feed stream, provided in an aqueous feed stream, provided in a pre-emulsion, provided in the initiator stream, or a combination thereof. The surfactant can also be provided as a separate continuous stream to the reactor.

Once polymerization is completed, the polymer dispersion can be chemically stripped thereby decreasing its residual monomer content. This stripping process can include a chemical stripping step and/or a physical stripping step. In some examples, the polymer dispersion is chemically stripped by continuously adding an oxidant such as a peroxide (e.g., t-butylhydroperoxide) and a reducing agent (e.g., sodium acetone bisulfite), or another redox pair to the reactor at an elevated temperature and for a predetermined period of time (e.g., 0.5 hours). Suitable redox pairs are described by A. S. Sarac in *Progress in Polymer Science* 24, 1149-1204 (1999). An optional defoamer can also be added if needed before or during the stripping step. In a physical stripping step, a water or steam flush can be used to further eliminate the non-polymerized monomers in the dispersion. Once the stripping step is completed, the pH of the polymer dispersion can be adjusted and a biocide or other additives can be added. Deformers, coalescing aids, or a plasticizer can be added after the stripping step or at a later time if desired. Cationic, anionic, and/or amphoteric surfactants or polyelectrolytes may optionally be added after the stripping step or at a later time if desired in the end product to provide a cationic or anionic polymer dispersion.

Once the polymerization reaction is complete, and the stripping step is completed, the temperature of the reactor can be reduced.

The (co)polymers described herein can have a glass-transition temperature ($T_g$) and/or a $T_g$ as measured by differential scanning calorimetry (DSC) using the mid-point temperature using the method described, for example, in ASTM 3418/82. The theoretical glass transition temperature or "theoretical $T_g$" of the (co)polymer refers to the estimated $T_g$ calculated using the Fox equation. The Fox equation can be used to estimate the glass transition temperature of a polymer or copolymer as described, for example, in L. H. Sperling, "Introduction to Physical Polymer Science", 2$^{nd}$ Edition, John Wiley & Sons, New York, p. 357 (1992) and T. G. Fox, *Bull. Am. Phys. Soc*, 1, 123 (1956), both of which are incorporated herein by reference. For example, the theoretical glass transition temperature of a (co)polymer derived from monomers a, b, . . . , and i can be calculated according to the equation below $$\frac{1}{T_g} = \frac{w_a}{T_{ga}} + \frac{w_b}{T_{gb}} + \ldots + \frac{w_i}{T_{gi}}$$

where $w_a$ is the weight fraction of monomer a in the copolymer, $T_{ga}$ is the glass transition temperature of a homopolymer of monomer a, $w_b$ is the weight fraction of monomer b in the copolymer, $T_{gb}$ is the glass transition temperature of a homopolymer of monomer b, $w_i$ is the weight fraction of monomer i in the copolymer, $T_{gi}$ is the glass transition temperature of a homopolymer of monomer i, and $T_g$ is the theoretical glass transition temperature of the copolymer derived from monomers a, b, . . . , and i.

In some examples, the (co)polymers described herein can have a theoretical $T_g$ of −75° C. or more, as calculated using the Fox equation (e.g., −70° C. or more, −65° C. or more, −60° C. or more, −55° C. or more, −50° C. or more, −45° C. or more, −40° C. or more, −35° C. or more, −30° C. or more, −25° C. or more, −20° C. or more, −15° C. or more, −10° C. or more, −5° C. or more, 0° C. or more, 5° C. or more, 10° C. or more, 15° C. or more, 20° C. or more, 25° C. or more, 30° C. or more, 35° C. or more, 40° C. or more, 45° C. or more, 50° C. or more, 55° C. or more, 60° C. or more, 65° C. or more, 70° C. or more, 75° C. or more, 80° C. or more, 85° C. or more, or 90° C. or more). In some examples, the (co)polymers described herein can have a theoretical $T_g$ of 100° C. or less, as calculated using the Fox equation (e.g., 95° C. or less, 90° C. or less, 85° C. or less, 80° C. or less, 75° C. or less, 70° C. or less, 65° C. or less, 60° C. or less, 55° C. or less, 50° C. or less, 45° C. or less, 40° C. or less, 35° C. or less, 30° C. or less, 25° C. or less, 20° C. or less, 15° C. or less, 10° C. or less, 5° C. or less, 0° C. or less, −5° C. or less, −10° C. or less, −15° C. or less, −20° C. or less, −25° C. or less, −30° C. or less, −35° C. or less, −40° C. or less, −45° C. or less, −50° C. or less, −55° C. or less, −60° C. or less, or −65° C. or less). The theoretical $T_g$ of the (co)polymer can range from any of the minimum values described above to any of the maximum values described above. For example, the (co)polymers described herein can have a theoretical $T_g$ of from −75° C. to 100° C., as calculated using the Fox equation (e.g., from −75° C. to 0° C., from 0° C. to 100° C., from −75° C. to −50° C., from −50° C. to −25° C., from −25° C. to 0° C., from 0° C. to 25° C., from 25° C. to 50° C., from 50° C. to 75° C., from 75° C. to 100° C., from −50° C. to 75° C., or from −25° C. to 50° C.).

In some examples, the aqueous dispersion can have an overall solids content of 40% or more (e.g., 45% or more, 50% or more, 55% or more, 60% or more, 65% or more, or 70% or more). In some examples, the aqueous dispersion can have an overall solids content of 70% or less (e.g., 65% or less, 60% or less, 55% or less, or 50% or less). The overall solids content of the aqueous dispersion can range from any of the minimum values described above to any of the maximum values described above. For example, the aqueous dispersion can have an overall solids content of from 40% to 70% (e.g., from 40% to 55%, from 55% to 70%, from 40% to 50%, from 50% to 60%, from 60% to 70%, from 45% to 65%, or from 40% to 60%). The overall solids content can be measured in an oven by water evaporation.

The aqueous dispersion can comprise a plurality of (co)polymer particles having a volume average particle size. The plurality of (co)polymer particles can have an average particle size of 40 nanometers (nm) or more (e.g., 50 nm or more, 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, 180 nm or more, 190 nm or more, 200 nm or more, 225 nm or more, 250 nm or more, 275 nm or more, 300 nm or more, 325 nm or more, 350 nm or more, 375 nm or more, 400 nm or more, 425 nm or more, or 450 nm or more). In some examples, the plurality of (co)polymer particles can have a volume average particle size of 500 nm or less (e.g., 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, or 60 nm or less). The volume average particle size of the plurality of (co)polymer particles can range from any of the minimum values described above to any of the maximum values described above. For example, the plurality of (co)polymer particles can have a volume average particle size of from 40 nm to 500 nm (e.g., from 40 nm to 300 nm, from 300 nm to 500 nm, from 40 nm to 175 nm, from 175 nm to 275 nm, from 275 nm to 375 nm, from 375 nm to 500 nm, or from 100 nm to 400 nm). The particle size can be determined using dynamic light scattering measurements using the Nanotrac Wave II Q available from Microtrac Inc., Montgomeryville, PA.

The aqueous dispersions can, for example, have a coagulum level of 100 ppm or less (e.g., 90 ppm or less, 80 ppm or less, 70 ppm or less, 60 ppm or less, 50 ppm or less, 40 ppm or less, 30 ppm or less, 20 ppm or less, 10 ppm or less, 5 ppm or less, or 1 ppm or less).

The compositions, (co)polymers, and/or aqueous dispersions disclosed herein can also be used in any application wherein conventional polymers derived from polymerizing a hydrophobic monomer can be used. The compositions disclosed herein can be used in a variety of applications including, but not limited to, asphalt compositions (e.g., chip seals, high performance highways, porous asphalt, open graded asphalt, trackless tack coats), architectural coatings (e.g., primers; interior paints such as flat, gloss, and semi-gloss paints; exterior paints; exterior and interior wood coatings; stucco coatings; waterproofing compositions; road paints; and roof coatings), adhesives (e.g., pressure sensitive adhesives, packaging adhesives), technical lamination, automotive and industrial bonding, binder compositions (e.g., carpet binder, carpet tile binder, artificial turf binder), nonwoven material binder compositions (e.g., tape saturation, roofing membrane coatings, gypsum board coatings, filtration media binders, abrasives, natural fiber composites), roof coatings, construction coatings (e.g., vinyl flooring adhesives, wood flooring adhesives, ceramic tile mastics, and thin-set mortars), paper binding and coating compositions (e.g., paper saturation compositions), and foams.

In some examples, the (co)polymer can be included in an asphalt composition. The asphalt composition can further include one or more additives. Suitable additives include inorganic salts, thickeners and fillers. Inorganic salts can be added, for example to improve emulsifiability, in an amount of up to 1 part by weight. Suitable inorganic salts include sodium chloride, potassium chloride, calcium chloride, aluminum chloride and mixtures thereof. Thickeners can be added in an amount of up to 0.5 parts by weight and can include associative thickeners, polyurethanes, alkali swellable latex thickeners, cellulose, cellulose derivatives, modified cellulose products, plant and vegetable gums, starches, alkyl amines, polyacrylic resins, carboxyvinyl resins, polyethylene maleic anhydrides, polysaccharides, acrylic copolymers, hydrated lime (such as cationic and/or nonionic lime), or mixtures thereof. Mineral fillers and/or pigments can include calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxides (e.g., titanium dioxide), aluminum hydroxide, aluminum trihydrate, satine white, and magnesium oxide. Fillers such as mineral fillers and carbon black can be included in an amount of up to 5 parts by weight or up to 2 parts by weight. For example, the filler can be provided in an amount of 0.1 part of greater or 0.5 parts or greater. The carbon black can be used to blacken the composition as is desired, for example, in fog seal applications. The mineral filler can be provided as a fine powder and can be used, for example, to increase the set rate of the asphalt emulsion or to reduce or prevent bleeding of the asphalt. Suitable mineral fillers include hydrated lime, limestone dust, Portland cement, silica, alum, fly ash, and combinations thereof. Mineral filler generally refers to a finely divided mineral product wherein at least 65 percent of which will pass through a No. 200 sieve, and typically has an average size that is less than 0.003 inches.

The asphalt composition can also include aggregate. The aggregate can be of varying sizes as would be understood by those of skill in the art. Any aggregate that is traditionally employed in the production of bituminous paving compositions can be used, including dense-graded aggregate, gap-graded aggregate, open-graded aggregate, reclaimed asphalt pavement, and mixtures thereof. Dense-graded aggregate exhibits the greatest mineral surface area (per unit of aggregate). Open-graded aggregate largely consist of a single, large-sized (e.g., around 0.375 inch to 1.0 inch) stone with very low levels (e.g., less than about two percent of the total aggregate) of fines (e.g., material less than 0.25 inch) or filler (e.g., mineral material less than 0.075 mm). Gap graded aggregate fall between dense-graded and open-graded classes. Reclaimed asphalt pavement (RAP) material generally reflects the gradation of the pavement from which the reclaimed material was obtained. If the original pavement was a dense-graded mix, the RAP will also be dense graded, although the filler content is generally observed to be lower than the design limits of the origin aggregate specifications. The aggregate can be applied in an amount of from 100 parts by weight to 2000 parts by weight.

Compositions that include aggregate can also include air voids in some examples. The air voids can be present in an amount of from 2% to 30% by volume (e.g., greater than 2% to 10% by volume).

An asphalt composition can be prepared by mixing asphalt, any aromatic recycling agents or non-asphaltic rosin materials, (co)polymer (for example, in the form of a latex dispersion), emulsifier, acid or base, water and any additives. The particular components can be mixed together by means known in the art. In some examples, the (co)polymer is pre-mixed with an anionic emulsifier or a cationic emulsifier to produce a charged (co)polymer before mixing the asphalt and the acid or base with the emulsifier and the (co)polymer. If aggregate is blended into the asphalt composition, it can be added, for example, after the other components are blended. In some examples, the asphalt composition is prepared at an elevated temperature, for example, from 160° C. to 200° C. (hot mix asphalt), from 120° C. to 140° C. (warm mix asphalt), or at temperatures below 120° C. (e.g., from 50° C. to 100° C. or from 60° C. to 80° C.). In some examples, the asphalt composition can be prepared at ambient temperature.

The asphalt composition can be applied for use in a pavement or paved surface. A pavement surface or a paved surface is a hard surface that can bear pedestrian or vehicular travel can include surfaces such as motorways/roads, parking lots, bridges/overpasses, runways, driveways, vehicular paths, running paths, walkways, and the like. The asphalt composition can be applied directly to an existing paved surface or can be applied to an unpaved surface. In some examples, the composition is applied to an existing paved layer as a tie layer, and a new layer comprising asphalt such as a hot mix layer is applied to the tie layer. The asphalt composition can be applied to a surface "cold", i.e., at a temperature below 40° C., or can be applied to at an elevated temperature, for example, from 50° C. to 120° C., from 55° C. to 100° C., or from 60° C. to 80° C.

In some examples, aggregate is blended into the asphalt composition before application to a surface. In some examples, aggregate is applied to the composition after it is applied to a surface. In some examples, sand can be applied to the composition after it is applied to a surface, for example, if the composition is to be used as a tack coat, to reduce the tackiness of the surface. The composition and optionally the aggregate can be compacted after application to the surface as would be understood by those of skill in the art.

In some examples, the composition is used as a tack coat or coating. The tack coat is a very light spray application of diluted asphalt emulsion that is used to promote a bond between an existing surface and the new asphalt application. The tack coat acts to provide a degree of adhesion or bonding between asphalt layers, and in some instances, may fuse the layers together. The tack coat also acts to reduce slippage and sliding of the layers relative to other layers in the pavement structure during use or due to wear and weathering of the pavement structure. As described above, the composition can be applied to an existing paved layer (such as a hot mix layer) as a tie layer as a tack coat, and a new layer comprising asphalt such as a hot mix layer can be applied to the tack coat. As would be understood by those skilled in the art, the tack coat typically does not include aggregate, although sand may be applied to the tack coat after application as mentioned above. The composition described herein can, in some examples, be a low-tracking or "trackless" coating such that, after the tack coating is cured, paving vehicles or other traffic may be permitted to pass over the coating such that the vehicle tires or treads stick to the coating a limited amount (low track) or not at all (trackless). The composition described herein can be low-tracking or "trackless," for example, at higher pavement temperatures (50° C.-60° C.) and/or with low or medium pen asphalts having a pen value of greater than 40 dmm. The tack coat is tacky and capable of bonding together layers of a pavement structure at ambient conditions for pavement construction or at elevated temperatures, e.g., up to 140° C. as discussed above. In fact, the tack coat provides a sufficiently flexible asphalt at low temperatures with sufficient bond strength to bond adjacent asphalt layers. The tack coat cures quickly such that the pavement layer may be applied to the coating, hours to days after the emulsion is applied to the substrate. The applied composition can cure in 15 minutes to 45 minutes, and may cure as rapidly as 5 minutes to 15 minutes after the composition is applied to the exposed surface. The cure rate will depend on the application rate, the dilution ratios used, the base course conditions, the weather, and other similar considerations. If the prepared pavement surface or base course contains excess moisture, the curing time of the emulsion may be increased.

In some examples, the composition can also be used as a fog seal. A fog seal is a surface treatment that applies a light application of the composition to an existing paved surface such as a parking lot to provide an enriched pavement surface that looks fresh and black. In some examples, the fog seal would include a filler such as carbon black to blacken the composition. As would be understood by those skilled in the art, the fog seal might not include aggregate. The fog seal compositions, like the bond coat compositions, have also been shown to be low-tracking or "trackless" coatings.

In some examples for the tack coat and fog seal, the asphalt can be present in an amount of from 58 to 62 parts by weight, the (co)polymer can be present in an amount of from 2 to 6 parts by weight, the emulsifier can be present in an amount of from 0.75 to 3 parts by weight, the acid or base can be present in an amount of from 0.75 to 3 parts by weight, any optional additives be provided in an amount of up to 5 parts by weight, and water can be present in an amount of from 30 to 40 parts by weight. In some examples, the composition can be further diluted with water. The composition can be applied at a rate of 0.05-0.10 gallons/yd$^2$.

In some examples, the composition can be used as a chip seal composition. Chip seals are the most common surface treatment for low-volume roads. The chip seal composition can be applied to a surface followed by the application of aggregate. In some examples for the chip seal, the asphalt can be present in an amount of from 64 to 67 parts by weight, the (co)polymer can be present in an amount of from 1.5 to 3.5 parts by weight, the emulsifier can be present in an amount of from 0.15 to 0.35 parts by weight, the acid or base can be present in an amount of from 0.15 to 0.35 parts by weight, any optional additives be provided in an amount of up to 5 parts by weight, and water can be present in an amount of from 30 to 40 parts by weight. The aggregate can be provided in an amount of from 200 to 1000 parts by weight.

In some examples, the composition can be used as a microsurfacing application. Microsurfacing is designed for quick traffic return with the capacity of handling high traffic volume roadways. For the microsurfacing composition, aggregate can be mixed in with the asphalt, (co)polymer, emulsifier and acid or base before application to a surface. In some examples for the microsurfacing, the asphalt can be present in an amount of from 60 to 62 parts by weight, the (co)polymer can be present in an amount of from 3 to 4.5 parts by weight, the emulsifier can be present in an amount of from 0.5 to 2.5 parts by weight, the acid or base can be present in an amount of from 0.5 to 2.5 parts by weight, any optional additives be provided in an amount of up to 5 parts by weight (e.g., 0.25 to 2 parts by weight of one or more inorganic salts or up to 5 parts by weight of a mineral filler), and water can be present in an amount of from 30 to 40 parts by weight. The aggregate can be provided in an amount of from 500 to 2000 parts by weight.

The resulting paved surface layer using the composition, once dried, includes the components provided in the composition with the exception of water. Thus, the paved surface layer can include asphalt in an amount of from 40 to 70 parts by weight, a (co)polymer in an amount of from greater than 0 to 10 parts by weight, an emulsifier in an amount of from 0.1 to 4 parts by weight, and an acid or base in an amount of from 0.1 to 4 parts by weight. In the case of a tack coat, the paved surface can include a first layer comprising asphalt; a tie layer provided on the first layer, comprising asphalt in an amount of from 40 to 70 parts by weight, the (co)polymer in an amount of from greater than 0 to 10 parts by weight, an emulsifier in an amount of from 0.1 to 4 parts by weight, and an acid or base in an amount of from 0.1 to 4 parts by weight; and a second layer comprising asphalt provided on the tie layer.

Although parts by weight are used for the compositions described herein, percentages by weight could be used interchangeability with the parts by weight, for example, where the composition includes the asphalt, the (co)polymer, the emulsifier, the acid or base, the water, and any additives excluding aggregate. For example, the composition can be described to include (a) asphalt in an amount of from 40 to 70 percent by weight; (b) a (co)polymer in an amount of from greater than 0 to 10 percent by weight; (c) an emulsifier in an amount of from 0.1 to 4 percent by weight; (d) an acid or a base in an amount of from 0.1 to 4 percent by weight; and (e) water in an amount of from 25 to 60 percent by weight.

In some examples, the compositions disclosed herein can be used in architectural coatings that can be applied to a wide variety of substrates, such as wood, metal, masonry, plaster, stucco, and plastic. In some examples, the architectural coatings include interior paints (e.g., flat, gloss and semi-gloss paints), exterior paints, exterior and interior wood coatings, stucco coatings, metal coatings, waterproofing compositions, road paints, and roof coatings. In some examples, the compositions disclosed herein can be used in binder compositions (e.g., carpet binder, carpet tile binder, artificial turf binder), non-woven material binder compositions (e.g., tape saturation, roofing membrane coatings, gypsum board coatings, filtration media binders, abrasives, natural fiber composites), roof coatings, and construction coatings (e.g., vinyl flooring adhesive, wood flooring adhesive, ceramic tile mastic, thin-set mortar), carpet compositions (e.g., carpet backing), adhesives (e.g., pressure sensitive adhesives, packaging adhesives), paper coating or binding, foams, technical lamination, or automotive and industrial bonding. The formulations for these applications can further include one or more additives. Examples of additional additives include, but are not limited to, one or more coalescing aids/agents (coalescents), plasticizers, defoamers, additional surfactants, pH modifying agents, fillers, pigments, dispersing agents (e.g., dispersants), initiators, thickeners, buffers or pH regulators, salts, biocides, lubricants (e.g., calcium stearate), preservatives, fire retardants or flame retardants, stabilizers, corrosion inhibitors, protective colloids, flattening agents, optical brighteners and fluorescent additives, curing agents, flow agents, wetting or spreading agents, leveling agents, hardeners, thixotropic agents, freeze store stability additives, ultraviolet light stabilizers, or combinations thereof. In some examples, the additive can be added to impart certain properties to the formulation such as smoothness, whiteness, increased density or weight, decreased porosity, increased opacity, flatness, glossiness, decreased blocking resistance, barrier properties, viscosity, tuft bind performance, peel/fuzz properties, and the like.

Suitable coalescing aids, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, propylene glycol n-butyl ether, dipropylene glycol n-butyl ether, 2,2,4-trimethyl-1,3-pentanediol monoisobutyrate, or combinations thereof.

Defoamers serve to minimize frothing during mixing and/or application of the formulation. Suitable defoamers include organic defoamers such as mineral oils, silicone oils, and silica-based defoamers. Exemplary silicone oils include polysiloxanes, polydimethylsiloxanes, polyether modified polysiloxanes, or combinations thereof. Exemplary defoamers include BYK®-035, available from BYK USA Inc., the TEGO® series of defoamers, available from Evonik Industries, the DREWPLUS® series of defoamers, available from Ashland Inc., and FOAMASTER® NXZ, available from BASF Corporation.

Plasticizers can be added to the compositions to reduce the glass transition temperature ($T_g$) of the compositions below that of the drying temperature to allow for good film formation. Suitable plasticizers include diethylene glycol dibenzoate, dipropylene glycol dibenzoate, tripropylene glycol dibenzoate, butyl benzyl phthalate, or a combination thereof. Exemplary plasticizers include phthalate based plasticizers.

Pigments that can be included in the compositions can be selected from $TiO_2$ (in both anatase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Examples of commercially available titanium dioxide pigments are KRONOS® 2101, KRONOS® 2310, available from Kronos World Wide, Inc., TI-PURE® R-900, available from DuPont, or TIONA® ATI commercially available from Millennium Inorganic Chemicals. Titanium dioxide is also available in concentrated dispersion form. An example of a titanium dioxide dispersion is KRONOS® 4311, also available from Kronos WorldWide, Inc. Suitable pigment blends of metal oxides are sold under the marks MINEX® (oxides of silicon, aluminum, sodium and potassium commercially available from Unimin Specialty Minerals), CELITE® (aluminum oxide and silicon dioxide commercially available from Celite Company), and ATOMITE® (commercially available from Imerys Performance Minerals).

Exemplary fillers also include clays such as attapulgite clays and kaolin clays including those sold under the ATTA-GEL® and ANSILEX® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), alumina trihydrate (ATM), mica (hydrous aluminum potassium silicate), pyrophyllite (aluminum silicate hydroxide), perlite, baryte (barium sulfate), Wollastonite (calcium metasilicate), and combinations thereof. More preferably, the at least one filler includes $TiO_2$, $CaCO_3$, and/or a clay. In some examples, the formulation further comprises a filler comprising alumina trihydrate (ATH), $CaCO_3$, or a combination thereof. In some examples, the fillers can, for example, provide desired performance relating to dimensional stability of the formulation. In some examples, wherein the formulation comprises an adhesive formulation, a binder formulation and/or a carpet formulation, the fillers can provide desired performance relating to the Tuft Bind strength and/or shedding/fuzz properties of a carpet tile comprising the formulation In some examples, one or more thickeners (rheology modifiers) can be added to increase the viscosity of the composition. Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). Other suitable thickeners that can be used in the formulations can include acrylic copolymer dispersions sold under the STEROCOLL™ and LATEKOLL™ trademarks from BASF Corporation, Florham Park, NJ; urethanes thickeners sold under the RHEOVIS™ trademark (e.g., Rheovis PU 1214); hydroxyethyl cellulose; guar gum; jaguar; carrageenan; xanthan; acetan; konjac; mannan; xyloglucan; urethanes; and mixtures thereof. The thickeners can be added to the composition formulation as an aqueous dispersion or emulsion, or as a solid powder. Thickeners can be added to an adhesive formulation to control the viscosity. The viscosity of an adhesive formulation can, for example, influence penetration relating to tuft bind performance and peel/fuzz properties of the adhesive formulation.

Additional surfactants can, for example, be used to control the froth properties relating to penetration of a formulation and weight control of a formulation. Surfactant types and levels can influence the rheology of a formulation to determine such properties.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof. The pH of the dispersion can be 3 or more (e.g., 4 or more, 5 or more, 6 or more, 7 or more, or 8 or more). In some examples, the pH of the dispersion can be 10 or less (e.g., 9 or less, 8 or less, 7 or less, 6 or less, or 5 or less). The pH of the dispersion can range from any of the minimum values described above to any of the maximum values described above. For example, the pH of the dispersion can be from 3 to 10 (e.g., from 3 to 7, from 7 to 10, from 3 to 5, from 5 to 7, from 4 to 9, or from 5 to 8).

Suitable biocides can be incorporated to inhibit the growth of bacteria and other microbes in the formulation during storage. Exemplary biocides include 2-[(hydroxymethyl)amino]ethanol, 2-[(hydroxymethyl)amino]2-methyl-1-propanol, o-phenylphenol, sodium salt, 1,2-benzisothiazolin-3-one, 2-methyl-4-isothiazolin-3-one (MIT), 5-chloro-2-methyl-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include biocides that inhibit the growth of mold, mildew, and spores thereof in the formulation. Examples of mildewcides include 2-(thiocyanomethylthio)benzothiazole, 3-iodo-2-propynyl butyl carbamate, 2,4,5,6-tetrachloroisophthalonitrile, 2-(4-thiazolyl)benzimidazole, 2-N-octyl-4-isothiazolin-3-one, diiodomethyl p-tolyl sulfone, as well as acceptable salts and combinations thereof. In certain examples, the formulation contains 1,2-benzisothiazolin-3-one or a salt thereof. Biocides of this type include PROXEL® BD20, commercially available from Arch Chemicals, Inc. The biocide can alternatively be applied as a film to the formulation and a commercially available film-forming biocide is Zinc Omadine® commercially available from Arch Chemicals, Inc.

Exemplary co-solvents and humectants include ethylene glycol, propylene glycol, diethylene glycol, and combinations thereof. Exemplary dispersants can include sodium polyacrylates in aqueous solution such as those sold under the DARVAN trademark by R. T. Vanderbilt Co., Norwalk, CT.

Architectural coatings (e.g., primers; interior paints such as flat, gloss, and semi-gloss paints; exterior paints; exterior and interior wood coatings; stucco coatings; waterproofing compositions; road paints; and roof coatings) can, for instance, include one or more pigments or dyes. Exemplary composition pigments include titanium dioxide composition pigments, MIRAGLOSS 91 (a kaolin clay composition pigment commercially available from BASF Corporation), LOPAQUE M (a kaolin clay composition pigment commercially available from Thiele Kaolin Company), and HYDROCARB 90 (a calcium carbonate composition pigment commercially available from Omya Paper). In some examples, the composition can include one or more dyes or colored pigments. Exemplary dyes can include basic dyes, acid dyes, anionic direct dyes, and cationic direct dyes. Exemplary colored pigments include organic pigments and inorganic pigments in the form of anionic pigment dispersions and cationic pigment dispersions.

In some examples, the architectural coatings can include other fillers. Other fillers can include naturally occurring minerals, such as, calcite, chalk, dolomite, kaolin, talc, talc/chlorite intergrowths, mica, diatomaceous earth, baryte, and quartz, but also synthetically prepared inorganic compounds, such as, for example, precipitated calcium carbonate, calcined kaolin or barium sulfate, and fumed silica.

In some examples, the architectural coatings can include further components. Further components can include, for example, preservatives for preventing fungal and bacterial infestation, solvents for influencing the open time (e.g., ethylene glycol or propylene glycol), solvents for affecting the formation of a film (e.g., butyl glycol, butyl diglycol, propylene glycol ethers such as Dowanol PP, DPM or DPnB (Dow), Texanol (Eastman), and high-boiling esters such as diisobutyl esters of glutaric, succinic, and adipic acid), dispersants for stabilizing the finely dispersed pigment and filler particles (e.g., polycarboxylates such as Pigmentverteiler A or NL (BASF SE) or oligophosphates or polyphosphates such as Calgon N), emulsifiers (e.g., Emulphor® OPS 25 and Lutensol® TO 89), antifreeze agents (e.g., ethylene glycol and propylene glycol), thickeners (e.g., Rheovis® products), or defoamers (e.g., Lumiten® products).

The aqueous dispersion comprising the (co)polymer can be used in adhesive formulations. The adhesive composition can be applied to a surface by any suitable coating technique, including spraying, rolling, brushing, or spreading. The adhesive formulation can be applied in a single coat, or in multiple sequential coats (e.g., in two coats or in three coats) as required for a particular application. The adhesive formulations can further include one or more additives, such as those described above. In some examples, the adhesive formulations can further comprise clay, delaminated clay, titanium dioxide, calcium carbonate, or a combination thereof.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art. Unless indicated otherwise, parts are parts by weight, temperature is in ° C.

Example 1

Herein, methods use a solid grade oligomer to copolymerize highly hydrophobic monomers in emulsion polymerization including, but not limited to, styrene-butadiene-, carboxylated styrene-butadiene-, styrene-acrylic-, and acrylic-emulsion polymers are described. The emulsion polymerizations can be carried out with or without a stabilizing surfactant and can be initiated by a redox-couple or a free-radical initiator which forms free radicals at elevated temperatures (60-100° C.).

The methods entail polymerization of a water-based emulsion of styrene-butadiene-, carboxylated styrene-butadiene-, styrene-acrylic-, or acrylic polymers containing 1-100 parts per hundred monomer (pphm) of a highly hydrophobic monomer, such as lauryl (meth)acrylate, stearyl (meth)acrylate, or heptadecyl (meth)acrylate. The polymerization is carried out in the presence of a solid grade oligomer, for example a styrene-acrylic or acrylic resin having from 5 wt % to 40 wt % acid functional repeat units. The solid grade oligomer can be either made by solution polymerization or high temperature continuous polymerization. An aqueous dispersion of the solid grade oligomer is added to the initial reactor charge, and the reaction may be carried out with or without additional water, seed latex, or surfactant in the initial reaction charge. The temperature of the initial reaction charge is then raised to 70-90° C., before monomers (including highly hydrophobic monomers) are fed to the reactor, either directly or via a pre-emulsion, in a semi-batch process. The emulsion polymerizations can be carried out with or without a stabilizing surfactant and can be initiated by a redox couple or a free-radical initiator which forms free radicals at elevated temperatures (60-100° C.). Monomers for this process include, but are not limited to styrene, butadiene, vinyl esters, acrylic and methacrylic monomers; and highly hydrophobic monomers include, but are not limited to lauryl acrylate, heptadecyl acrylate, stearyl acrylate, linoleyl acrylate lauryl methacrylate, heptadecyl methacrylate, stearyl methacrylate, and/or linoleyl methacrylate.

Figure 1:
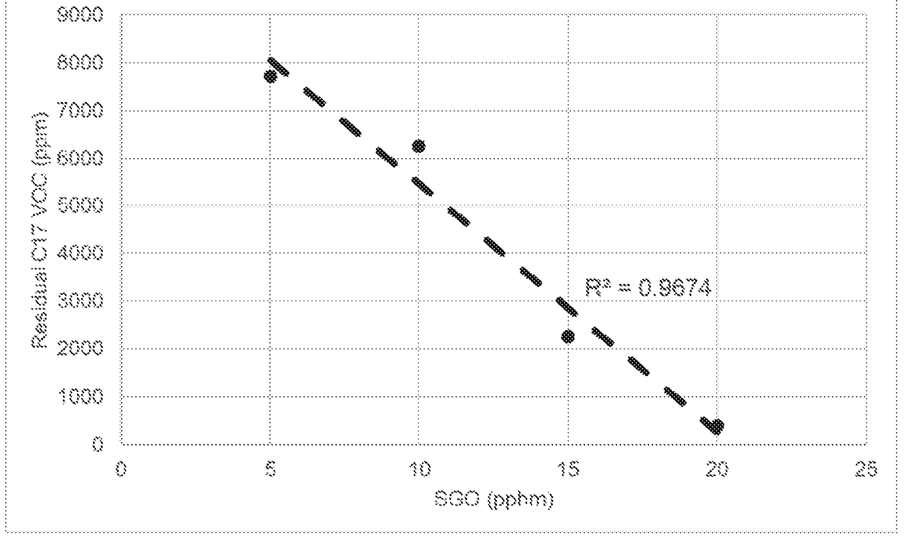
FIG. 1 is a graph of the residual heptadecyl acrylate monomer concentration vs. the solid grade oligomer (support resin) amount expressed as parts per 100 parts monomer.

Acrylic emulsion polymers were synthesized using standard emulsion polymerization techniques. The monomers employed in the emulsion polymerization were butyl acrylate (BA), methyl methacrylate (MMA) and varying amounts of the highly hydrophobic monomer heptadecyl acrylate (C17-acrylate). The glass transition temperature was kept constant for each polymer, and the residual C17-acrylate was determined by direct injection gas chromatography methods. Table 2 shows that without support resin the residual amount of C17-acrylate is above 1000 parts per million (ppm), even when it was only used at 1 part per hundred monomer (pphm), indicating that C17-acrylate does not co-polymerize well in a standard emulsion polymerization, due to the poor diffusion rate of highly hydrophobic monomers through the aqueous phase. However, $C_{17}$-acrylate can be co-polymerized in high amounts with the addition of a support resin. FIG. 1 shows that at 40 pphm of C$_{17}$-acrylate the residual monomer amount can be lowered to <400 ppm with the addition of 20 pphm of a support resin to the initial reaction charge.

TABLE 2

Residual highly hydrophobic monomer with varying amount of heptadecyl acrylate and support resin.

| Sample | C17-acrylate (pphm) | SGO (pphm) | Residual C17-acrylate (ppm) |
|---|---|---|---|
| 1 | 1 | 0 | 906 |
| 2 | 2.5 | 0 | 2020 |
| 3 | 10 | 0 | 7708 |
| 4 | 15 | 0 | 7777 |
| 5 | 40 | 5 | 7710 |
| 6 | 40 | 10 | 6260 |
| 7 | 40 | 15 | 2262 |
| 8 | 40 | 20 | 388 |

In addition, the emulsion polymerization of the very hydrophobic monomers in styrene-butadiene copolymers has been unexpectedly efficient. Accordingly, hydrophobic monomer contents as high as 70 parts based on total monomer polymerized have been achieved. Table 3 shows the hydrophobic monomers used in a styrene-butadiene copolymerization using alkaline solutions of solid-grade oligomers. These are copolymers of styrene, α-methyl styrene and acrylic acid that solubilize at high pH. It was unexpectedly found that in the presence of such oligomers the copolymerization of very hydrophobic monomers is not aqueous-phase transport-limited as the case is in the absence of said oligomers, resulting in latexes that have very low levels of coagulum and very low residual monomer levels after the polymerization.

TABLE 3

Formulations including hydrophobic monomers used in a styrene-butadiene copolymerization using alkaline solutions of solid-grade oligomers

| monomers | 5 parts | 10 parts | 15 parts | 20 parts | 25 parts | 30 parts | 40 parts | 50 parts | 60 parts | 70 parts |
|---|---|---|---|---|---|---|---|---|---|---|
| Heptadecyl acrylate (C17 A) | X | X |   | X | X | X | X | X |   |   |
| Cyclohexyl methacrylate (CHMA) | X | X | X |   | X | X | X | X | X | X |
| Stearyl Methacrylate (SMA) | X |   | X |   | X |   | X |   |   |   |
| Lauryl Methacrylate (LMA) | X |   |   |   |   |   |   |   |   |   |
| Tert-Butyl Methacrylate (TBMA) | X |   |   |   |   |   |   |   |   |   |
| Isobutyl acrylate (ISBA) | X |   |   |   |   |   |   |   |   |   |
| Isodecyl acrylate (ISDA) |   |   | X |   | X | X | X |   |   |   |

Although not wishing to be bound by a specific theory, it is postulated that in the presence of the solid grade oligomer, the solubility of the hydrophobic monomers in the aqueous phase increases, resulting in enhanced monomer transport to the growing latex particles where polymerization takes place. Accordingly, the polymerization rate is higher than in the absence of the solid grade oligomer resulting in low levels of residual (free) monomer. It is also postulated that the solid grade oligomer itself may act as a new particle generator resulting in higher polymerization rates. Finally, a combination of enhanced monomer solubility and particle generation can be the prevalent mechanism in the polymerization of hydrophobic monomers in the presence of the solid grade oligomers.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method of making a composition, the method comprising polymerizing monomers comprising:
   a hydrophobic monomer having a solubility in water of 0.2 g/100 g or less as measured at 20° C., wherein the hydrophobic monomer comprises a substituted or unsubstituted C$_{10}$-C$_{22}$ alkyl (meth)acrylate, a substituted or unsubstituted $C_8$-$C_{20}$ alkenyl (meth)acrylate, a substituted or unsubstituted $C_5$-$C_{12}$ cycloalkyl (meth)acrylate, or a combination thereof; and in the presence of a solid grade oligomer, thereby forming a (co)polymer derived from the hydrophobic monomer, wherein the (co)polymer is derived from greater than 5% by weight to 40% by weight of the hydrophobic monomer based on the total monomer weight.

2. The method of claim 1, wherein the hydrophobic monomer comprises lauryl (meth)acrylate, stearyl (meth)acrylate, heptadecyl (meth)acrylate, linoleyl (meth)acrylate, behenyl acrylate, cyclohexyl (meth)acrylate, isodecyl (meth)acrylate), nonyl (meth)acrylate, tridecyl (meth)acrylate, pentadecyl (meth)acrylate, 3-methylbut-2-enyl methacrylate, 3,7-dimethylocta-2,6-dienyl (meth)acrylate, or a combination thereof.

3. The method of claim 2, wherein the hydrophobic monomer comprises heptadecyl (meth)acrylate.

4. The method of claim 1, wherein the hydrophobic monomer further comprises styrene, butadiene, a vinyl ester having a solubility in water of 0.2 g/100 g or less as measured at 20° C., a (meth)acrylate having a solubility in water of 0.2 g/100 g or less as measured at 20° C., or a combination thereof.

5. The method of claim 1, wherein the hydrophobic monomer comprises heptadecyl (meth)acrylate, the (co)polymer is derived from 5% to 40% by weight of heptadecyl (meth)acrylate based on the total monomer weight, and the hydrophobic monomer does not include butadiene.

6. The method of claim 1, wherein the method further comprises polymerizing a non-hydrophobic monomer with the hydrophobic monomer.

7. The method of claim 6, wherein the non-hydrophobic monomer further comprises a (meth)acrylate having a solubility in water of greater than 0.2 g/100 g, a (meth)acrylic acid, or a combination thereof.

8. The method of claim 6, wherein the non-hydrophobic monomer includes methyl methacrylate.

9. The method of claim 1, wherein the residual amount of the hydrophobic monomer after the polymerization of the (co)polymer is 1000 ppm or less.

10. The method of claim 1, wherein the solid grade oligomer comprises a styrene-acrylic resin or pure acrylic resin.

11. The method of claim 1, wherein the solid grade oligomer comprises a styrene-acrylic resin and the solid grade oligomer is derived from styrene, a-methyl styrene, or a combination thereof.

12. The method of claim 11, wherein the solid grade oligomer is further derived from a carboxylic acid monomer, or a salt or ester thereof.

13. The method of claim 12, wherein the carboxylic acid monomer includes acrylic acid.

14. The method of claim 1, wherein the solid grade oligomer comprises an amine salt of a modified acrylic copolymer, an ammonium salt of a modified acrylic copolymer, or a combination thereof.

15. The method of claim 1, wherein the solid grade oligomer comprises 5-40 wt % acid functional repeat units.

16. The method of claim 1, wherein the (co)polymer is polymerized in the presence of a surfactant.

17. The method of claim 16, wherein the surfactant comprises a non-ionic surfactant, an anionic surfactant, or a combination thereof.

18. The method of claim 16, wherein the surfactant comprises a non-ionic surfactant and an anionic surfactant.

19. The method of claim 16, wherein the surfactant comprises a copolymerizable surfactant.

20. The method of claim 1, wherein the (co)polymer is polymerized in the presence of a chain transfer agent.

21. The method of claim 1, wherein the monomers are polymerized in an aqueous medium using emulsion polymerization.

22. The method of claim 1, wherein the monomers are polymerized at a polymerization temperature of from 50° C. to 90° C.

23. The method of claim 1, wherein the monomers are fed over a period of from 2 to 6 hours.

* * * * *